UNITED STATES PATENT OFFICE.

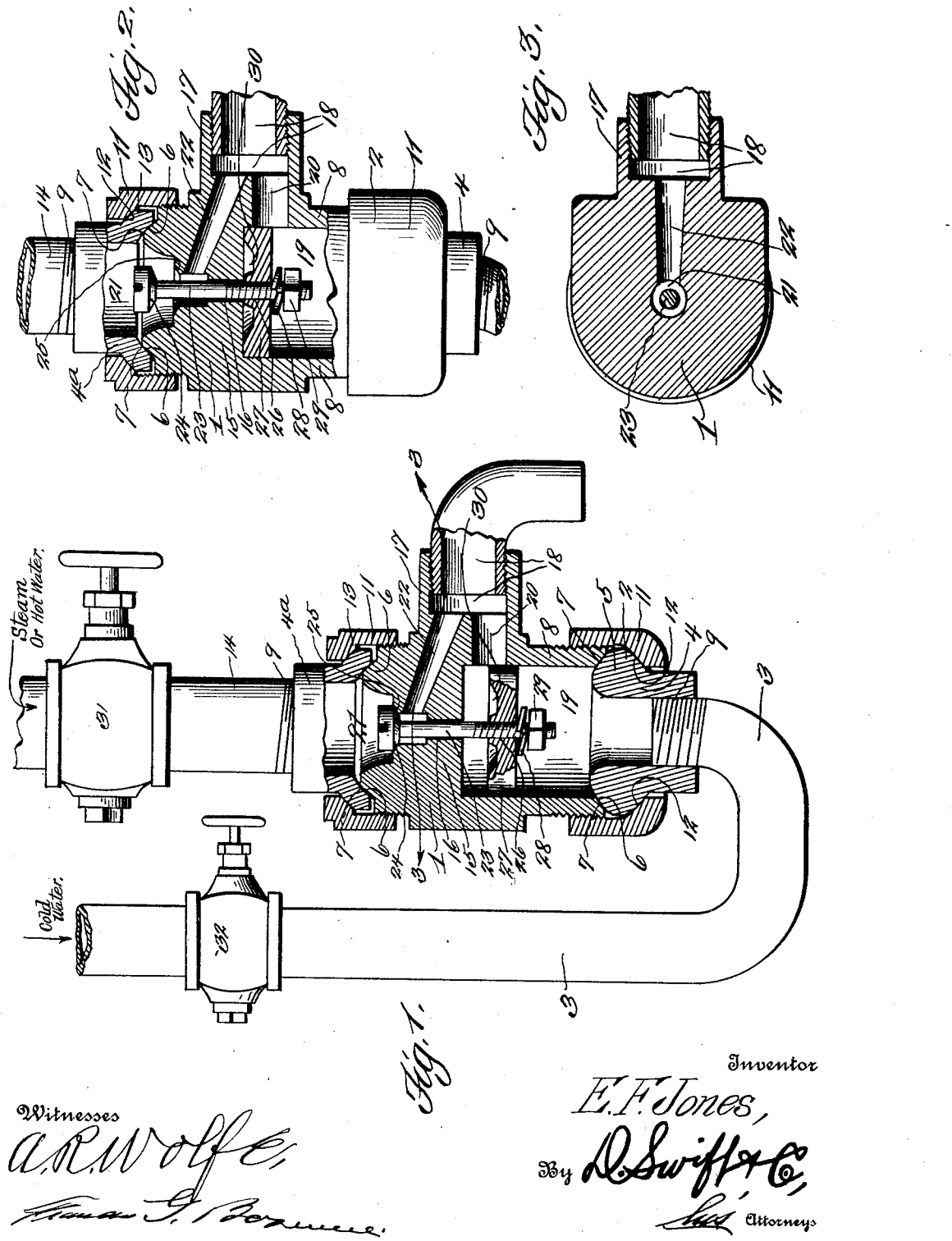

EDWARD F. JONES, OF ST. JOSEPH, MISSOURI.

VALVE.

1,113,644. Specification of Letters Patent. Patented Oct. 13, 1914.

Application filed March 11, 1914. Serial No. 823,936.

*To all whom it may concern:*

Be it known that I, EDWARD F. JONES, a citizen of the United States, residing at St. Joseph, in the county of Buchanan and State of Missouri, have invented a new and useful Valve; and I do hereby declare the following to be a full, clear, and exact description of the invention, such as will enable others skilled in the art to which it appertains to make and use the same.

This invention relates to an improved valve, for use in connection with a water system such as shower bath system.

An object of the invention is the provision of a valve, so constructed that when the cold water is turned on the valve is opened or raised, thereby allowing an inflow of steam to mix with the cold water, so as to heat the same to the proper temperature.

In practical fields the details of construction may necessitate alterations, falling within the scope of what is claimed.

The invention comprises further features and combination of parts, as hereinafter set forth, shown in the drawings and claimed.

In the drawings: Figure 1 is a vertical sectional view through the piston, showing the valve closed. Fig. 2 is a fragmentary sectional view showing the valve opened or raised. Fig. 3 is a transverse sectional view on line 3—3 of Fig. 1.

Referring more particularly to the drawings, 1 designates a valve casing having the usual coupled connection 2 at its lower end with the cold water supply pipe 3. Said coupled connection 2 comprises the sleeve 4, which has an enlargement or bead 5, constructed with a spherical bearing surface 6 to correspond and engage with a similar bearing surface 7 of the threaded extension 8 of the valve casing. The cold water supply pipe 3 is threaded at 9 in the sleeve 4. A collar 11 engages the shoulder 12 of the enlargement or bead 5, and is also threaded to the extension of the valve casing, so as to hold the sleeve in place. In this coupled connection 2 the convexed spherical surface is carried by the sleeve 4. The upper end of the valve casing has a coupled connection 13 with the steam supply pipe 14. This coupled connection 13 is similar to the coupled connection 2, and the parts thereof are correspondingly designated, however, with the exception that the convexed bearing surface is carried by the valve casing, while the concaved spherical bearing surface is formed on the sleeve 4ª.

The body of the valve casing is constructed with a heavy partition wall 15 having a centrally arranged bore 16, and adjacent the heavy partition wall the valve casing is constructed with an outlet nozzle 17 having the passage 18. The passage 18 communicates with the lower chamber 19 of the valve casing by way of the port 20, while the upper chamber 21 of the valve casing communicates with the passage 18 by means of the port 22.

Mounted in the bore 16 is a valve plunger or pin 23, its upper end having a conical valve 24, adapted to coöperate with the valve seat 25 to close the port 22 when the pin or plunger lowers to cut off the supply of steam. Threaded at 26 to the lower portion of the pin or plunger is a disk valve 27, which, when the pin or plunger lowers, closes the port 20, thereby shutting off the supply of cold water through the passage 18. The pin or plunger fits the bore in such wise as to permit the plunger or pin to lower by gravitation to some extent. A spring split collar 28 is interposed between the disk valve 27 and the lock nut 29, which is also threaded upon the pin or plunger, to lock the disk valve 27 against displacement, the split spring collar yieldably bears against the lock nut and the disk valve, yet at the same time affording a sufficient amount of friction to hold the disk valve against displacement in a rotary direction. The upper surface of the disk valve is constructed with an annular depression 30, thereby forming a slight space between the partition wall and the disk valve.

As before stated, the pin or plunger does not closely and frictionally engage the bore, to such an extent as to prevent the conical valve on the upper end from closing. When the supply of cold water is shut off, the steam or hot water still flowing will not instantly close the valve 24, owing to the upper portion of the valve 24 not having such a broad surface, and not filling the chamber 21. However, after a certain amount of steam has entered the space between the disk valve and the partition, which space is afforded owing to the provision of the depression 30, the pin or plunger and the valve 24 will begin to lower, that is, when the supply of cold water is shut off.

In the operation the steam is turned on by means of the valve 31, then the cold water is turned on by opening the valve 32. The cold water passes through the pipe 3, raising the disk valve 27 opening the port 20, and at the same time unseating the conical valve 24, thereby opening the port 22, which will allow steam to enter the passage 18 mixing with the cold water and heating the same. When the cold water is shut off at 32, without shutting off the steam at 31, the port 22 is closed by the valve 24 in the manner heretofore stated. However, when the steam or hot water and the cold water are both shut off at 31 and 32, the disk valve and the valve 24 are closed by gravitation.

The invention having been set forth, what is claimed as new and useful is:—

A valve comprising a casing having a partition wall and provided with a chamber above the wall in which the steam enters and a chamber below the wall in which the cold water enters, said wall having a central bore being enlarged at one end, the enlargement terminating in a valve seat at its upper portion, said casing having an outlet passage adjacent the wall and intermediate the chambers, a port of communication between the outlet passage and the enlargement of the bore below the valve seat, a port of communication between the passage and the lower chamber immediately adjoining the under surface of said wall, a plunger slightly smaller in diameter than the bore and guided therein and having a conical valve at its upper end coöperating with said valve seat to close the first port, a disk valve carried by the lower end of said plunger to control the second port, said disk valve being adjustable on the plunger and designed to contact with the under surface of said wall which constitutes an abutment when the disk valve is entirely raised to open the second port, a lock nut adjustable on the lower end of the plunger, a yieldable member between the nut and the disk valve, said disk valve having an annular depression on its upper surface forming a space between the partition wall and the disk valve to receive a portion of the steam pressure to cause the plunger to lower, which is also assisted in lowering by gravitation.

In testimony whereof I have signed my name to this specification in the presence of two subscribing witnesses.

EDWARD F. JONES.

Witnesses:
 ANGELIA PICKLE,
 LAURA PICKLE.

---

Copies of this patent may be obtained for five cents each, by addressing the "Commissioner of Patents, Washington, D. C."